US006373567B1

(12) United States Patent
Wise et al.

(10) Patent No.: US 6,373,567 B1
(45) Date of Patent: Apr. 16, 2002

(54) DISPERSIVE NEAR-IR RAMAN SPECTROMETER

(75) Inventors: Kent Lawson Wise, Portsmouth; John Brittain Cooper, Virginia Beach, both of VA (US); Christian Lee Schoen, Laramie, WY (US)

(73) Assignee: Micron Optical Systems, Suffolk, VA (US)

( * ) Notice: Subject to any disclaimer, the term of this patent is extended or adjusted under 35 U.S.C. 154(b) by 0 days.

(21) Appl. No.: 09/466,295

(22) Filed: Dec. 17, 1999

(51) Int. Cl.[7] .............................. G01J 3/44; G01N 21/65
(52) U.S. Cl. ...................................................... 356/301
(58) Field of Search .......................................... 356/301

(56) References Cited

U.S. PATENT DOCUMENTS

| | | | |
|---|---|---|---|
| 5,011,284 A | | 4/1991 | Tedesco et al. |
| 5,112,127 A | | 5/1992 | Carrabba et al. |
| 5,351,121 A | * | 9/1994 | Baer et al. .................. 356/301 |
| 5,377,004 A | | 12/1994 | Owen et al. |
| 5,442,439 A | | 8/1995 | Battey et al. |
| 5,617,205 A | | 4/1997 | Dou et al. |
| 5,657,120 A | | 8/1997 | Smith |
| 5,751,415 A | | 5/1998 | Smith et al. |
| 5,754,289 A | | 5/1998 | Ozaki et al. |
| 5,828,450 A | | 10/1998 | Dou et al. |
| 5,862,273 A | | 1/1999 | Pelletier |

OTHER PUBLICATIONS

D. Bruce Chase, Fourier Transform Raman Spectroscopy, Journal of the American Chemical Society, Nov. 26, 1986, pp. 7485–7488, vol. 108, American Chemical Society, Washington, DC.

Bruce Chase, Fourier Transform Raman Spectroscopy, Analytical Chemistry, Jul. 15, 1987, pp. 881A–889A, vol. 59, American Chemical Society, Washington, DC.

Asselin et al, FT–Raman Spectroscopy at 1.339 Micrometers, Applied Spectroscopy, 6/94, pp. 669–701, vol. 48, Society for Applied Spectroscopy, Baltimore, MD.

Wang et al, Evaluation of a Diode/Laser Charge Coupled Device Spectrometer for Near–Infrared Raman Spectroscopy, Analytical Chemistry, Dec. 1, 1989, pp. 2647–2651, vol. 61, American Chemical Society, Washington, DC.

Angel et al, Near–Infrared Surface–Enhanced Raman Spectroscopy Using a Diode Laser, Analytical Chemistry, Aug. 1, 1989, pp. 1648–1652, vol. 61, American Chemical Society, Washington, DC.

Vickers et al, Compact Raman Spectrometers: Data Handling Methods, Applied Spectroscopy, 8/96, pp. 1074–1081, vol. 50, Society for Applied Spectroscopy, Baltimore, MD.

Schwab et al, Versatile, Efficient Raman Sampling with Fiber Optics, Analytical Chemistry, 10/84, pp. 2199–2204, vol. 56, American Chemical Society, Washington, DC.

Myrick et al, Comparison of Some Fiber Optic Configurations for Measurement of Luminescence and Raman Scattering, Applied Optics, Mar. 20, 1990, pp. 1333–1344, vol. 29, Optical Society of America, Washington, DC.

(List continued on next page.)

Primary Examiner—F. L. Evans

(57) ABSTRACT

A compact dispersive near-IR Raman spectrometer is disclosed. The Raman spectrometer consists of a diode pumped solid state (DPSS) laser emitting light at 1064 nm and an InGaAs diode array detector. The DPSS laser is used as an excitation source for stimulating Raman scattering of the sample being analyzed. The Raman signal is collected and filtered to remove the DPSS laser Rayleigh scatter. The collected and filtered Raman signal is dispersed using a volume holographic grating. The dispersed Raman signal is detected using a linear InGaAs diode array detector that is sensitive to light in the wavelength region 900–1700 nm. The dispersive near-IR Raman spectrometer is rugged and compact and enables the collection of high signal-to-noise Raman spectra with high wavelength stability and without the presence of interfering fluorescent backgrounds.

20 Claims, 6 Drawing Sheets

OTHER PUBLICATIONS

Angel et al, Wavelength Selection for Fiber Optic Raman Spectroscopy Part 1, Applied Optics, Mar. 20, 1990, pp. 1350–1352, vol. 29, Optical Society of America, Washington, DC.

Vickers et al, Changes in Raman Spectra Due to Near–IR Excitation, Applied Spectroscopy, 7/92, pp. 1200–1202, vol. 46, Society for Applied Spectroscopy, Baltimore, MD.

* cited by examiner

DISPERSIVE NEAR-IR RAMAN SPECTROMETER

CROSS REFERENCES TO RELATED APPLICATIONS

Not Applicable.

STATEMENT REGARDING FEDS SPONSORED R & D

Not Applicable.

REFERENCE TO MICROFICHE APPENDIX

Not Applicable.

BACKGROUND OF THE INVENTION

I. Field of the Invention

The present invention relates to the field of instrumentation used for Raman spectroscopy. The instrument can be used to analyze solids, liquids, and gasses.

II. Description of Prior Art

Raman spectroscopy was discovered by Chandrasekhara Venkata Raman in the early 1900's. See C. V. Raman, *The molecular scattering of light: Nobel lecture*, Calcutta University Press, Calcutta, 1930. In its original form, filtered solar energy was used to generate Raman scattering of molecular samples. The resulting Raman spectra contained vibrational information about the molecular species, thus allowing them to be identified with a spectral "fingerprint". Since its inception, the technique has undergone radical change. In particular, the widespread use of lasers as excitation sources in the 1970's resulted in a renaissance of this method of chemical analysis. Indeed, many investigators reported the use of Raman not only to qualitatively identify molecular species, but also to conduct quantitative analysis of these species. Since the generated Raman spectral intensity is linearly dependent on the excitation power, lasers quickly became the excitation method of choice. However, the large size of lasers in general at that time, the difficulty in aligning optics, and the overall fragility of the systems relegated Raman spectroscopy as a laboratory method. In addition, due to limitations of the utilized spectrometers and detectors, visible and ultra-violet wavelength lasers were used exclusively. This often gave rise to intense and interfering fluorescence which obscured the weak Raman scattering. Also, the acquisition of a single Raman spectrum was very time consuming since a moving dispersive grating was used to scan the dispersed Raman wavelengths across a single element detector. The acquisition of a single spectrum often required more than 1 hour. The subsequent invention and commercialization of the FT-Raman spectrometer (Fourier Transform Raman Spectrometer) resulted in a second renaissance of Raman spectroscopy in the 1980's. In this instrument, a Nd:YAG laser (flash lamp pumped solid state laser emitting at 1064 nm) was used to excite the sample and the resulting Raman signal was detected using an interferometer with a single element detector. This resulted in a much superior Raman signal in a shorter acquisition time due to the multiplex effect. In addition, the use of a near-IR laser resulted in complete elimination of fluorescence in most samples and a severe reduction of fluorescence in all samples. (Chase, D. Bruce., "Fourier transform Raman spectroscopy", Journal of the American Chemical Society, Volume 108, 1986, pages 7485–8). These instruments were rapidly adopted by both academia and industry (Cooper, John B.; Wise, Kent L.; Groves, J., "Determination of octane numbers and Reid vapor pressure of commercial petroleum fuels using FT-Raman spectroscopy and partial least-squares regression analysis", Analytical Chemistry, Volume 67, 1995, pages 4096–100; Cooper; John B, Bledsoe, Jr.; Roy R, Wise; Kent L., Sumner; Michael B, Welch; William T, Wilt; Brian K, U.S. Pat. No. 5,892,228: Process and apparatus for octane numbers and reid vapor pressure by Raman spectroscopy, Apr. 6, 1999; Cooper; John B., Flecher, Jr.; Philip E., Welch; William T. , U.S. Pat. No. 5,684,580: Hydrocarbon analysis and control by Raman spectroscopy, Nov. 4, 1997; Cooper; John B., Wise; Kent L., Welch; William T., Sumner; Michael B., U.S. Pat. No. 5,596,196: Oxygenate analysis and control by Raman spectroscopy, Jan. 21, 1997; Cooper, John B, Wise, Kent L., Bledsoe, Roger R., "Comparison of Near-IR, Raman, and Mid-IR Spectroscopies for the Determination of BTEX in Petroleum Fuels", Applied Spectroscopy, Volume 51, 1997, pages 1613–16). To date there have been numerous improvements on the original design including improvements in detectors, interferometers, and lasers (Chase, Bruce., "Fourier transform Raman spectroscopy", Analytical Chemistry, Volume 59, 1987, pages 881A–2A; Asselin, Kelly J, Chase, B., "FT-Raman Spectroscopy at 1.339 Micrometers", Applied Spectroscopy, Volume 8, 1994, pages 699–704; Burch; Robert V., U.S. Pat. No. 5,247,343: Raman spectrometer having optical subtraction filters, Sep. 21, 1993).

Unfortunately, these instruments have remained costly and also very sensitive to vibrations; thus making them unlikely candidates for industrial applications other than research labs. In the late 1980's, the development of four key technologies led to the third renaissance of Raman spectroscopy in the 1990's. These were the development of silicon based CCD (charge coupled device) array detectors; the development of small low cost near-IR diode lasers; the development of fast image corrected dispersive spectrographs (see for example Battey; David E., Owen; Harry, Tedesco; James M., U.S. Pat. No. 5,442,439: Spectrograph with multiplexing of different wavelength regions onto a single opto-electric detector array, Sep. 24, 1996); and the emergence of high-quality fiber optics. In combination, these components allowed a new generation of Raman spectrometers to emerge based on the older dispersive Raman technique used originally by Raman himself (Lombardi, Daniel R., Mann, Charles K., Vickers, Thomas J., "Determination of Water in Slurries by Fiber-Optic Raman Spectroscopy", Applied Spectroscopy, Volume 49, 1995, pages 220–25). The use of a CCD silicon array detector allowed the entire spectrum to be acquired simultaneously, hence giving rise to the multiplex advantage which was previously only attainable through the use of the FT-Raman method (Frank, Christopher J.; Redd, Douglas C. B.; Gansler, Ted S.; McCreery, Richard L., "Characterization of Human Breast Biopsy Specimens with Near-IR Raman Spectroscopy", Analytical Chemistry, Volume 66, Number 3, 1994; Wang, Yan.; McCreery, Richard L. "Evaluation of a diode laser/charge coupled device spectrometer for near-infrared Raman spectroscopy", Analytical Chemistry, Volume 61, 1989, pages 2647–51; Angel, Stanley M.; Myrick, Michael L., "Near-infrared surface-enhanced Raman spectroscopy using a diode laser", Analytical Chemistry, Volume 61, 1989, pages 1648–52; Tedesco; James M., Owen; Harry, Chang; Byung J., U.S. Pat. No. 5,011,284: Detection system for Raman scattering employing holographic diffraction, Apr. 30, 1991; and Vickers, Thomas J, Rosen, Christopher A, Mann, Charles K, "Compact Raman Spectrometers: Data Handling Methods, Applied Spectroscopy, Volume 50, 1996, pages 1074–80).

The use of fiber optics and remote probes allowed for easy sampling (Schwab, Scott D.; McCreery, Richard L., "Versatile, efficient Raman sampling with fiber optics", Analytical Chemistry, Volume. 56, 1984, pages 2199–204; Myrick, M. L.; Angel, Stanley M.; Desiderio, R., "Comparison of some fiber optic configurations for measurement of luminescence and Raman scattering", Applied Optics, Volume 29, 1990, pages 1333–44; Owen; Harry, Tedesco; James M., Slater; Joseph B., U.S. Pat. No. 5,377,004: Remote optical measurement probe, Dec. 27, 1994; Pelletier; Michael J. , U.S. Pat. No. 5,862,273: Fiber optic probe with integral optical filtering, Jan. 19, 1999; Carrabba; Michael M., Rauh; R. David, U.S. Pat. No. 5,112,127: Apparatus for measuring Raman spectra over optical fibers, May 12, 1992; Schrader; Bernhard, U.S. Pat. No. 5,534,997: Raman spectrometer using a remote probe with enhanced efficiency, Jul. 9, 1996).

The use of diode lasers allowed for some reduction of fluorescence (Smith; Brian J. E., U.S. Pat. No. 5,657,120: Laser diode system for Raman spectroscopy, Aug. 12, 1997; Angel, S. Michael.; Myrick, Michael L., "Wavelength selection for fiber optic Raman spectroscopy", Applied Optics, Volume 29, 1990, pages 1350–2; Vickers, Thomas J., Mann, Charles K., Tseng, Ching-Hui, "Changes in Raman Spectra Due to Near-IR Excitation", Applied Spectroscopy, Volume 46, 1992, pages 1200–6).

In total, the advantages of these new instruments were 1) extremely high signal to noise ratios which allowed the acquisition of Raman spectra in seconds, 2) low cost, 3) a significant reduction in fluorescence with near-IR excitation near 800 nm and 4) robustness. These instruments have been rapidly adopted for both research as well as industrial control applications (Smith; Lee M, Benner; Robert E., Christensen; Douglas A., Harris; Joel M., Johnson; Carl W., Rallison; Richard D., U.S. Pat. No. 5,751,415: Raman spectroscopy apparatus and method for continuous chemical analysis of fluid streams, May 12, 1998).

Unfortunately, the use of a CCD detector limits the long wavelength range of the instruments to less than 1000 nm, and thus mandates excitation at wavelengths below 900 nm. Therefore, fluorescence is still a significant problem for many samples. In addition, the utilized diode lasers are notoriously unstable with respect to emission wavelength (Cooper; John B, Flecher; Philip E., Welch; William T., U.S. Pat. No. 5,856,869: Distributed bragg reflector diode laser for Raman excitation and method for use, Jan. 5, 1999; Ozaki; Yukihiro , Nishinomiya, Dou; Xiaoming, Yamaguchi; Yoshinori, Uenoyama; Harumi, U.S. Pat. No. 5,754,289: Raman scattered light apparatus, May 19, 1998; Dou; Xiaoming, Yamaguchi; Yoshinori, Uenoyama; Harumi, Wang; Yung X., U.S. Pat. No. 5,617,205: Spectral measuring method and spectral measuring apparatus, Apr. 1, 1997; Dou; Xiaoming, Takama; Toshio, U.S. Pat. No. 5,828,450: Spectral measuring apparatus and automatic analyzer, Oct. 27, 1998).

Fluctuations in temperature, operating current, or back reflected light can result in laser mode "hops" where the laser oscillates between two or more wavelengths (Cooper, John B, Flecher, Philip E., Welch, William T, "Elimination of Mode Hopping and Frequency Hysteresis in Diode Laser Raman Spectroscopy: The Advantages of a Distributed Reflector Diode Laser for Raman Excitation", Applied Spectroscopy, Volume 49, 1995, pages 1692–98). This results in significantly degraded Raman spectra. There have been a few attempts to overcome this problem using grating stabilized lasers or by reverting back to shorter wavelength lasers which are stable but give rise to increased fluorescence. With the exception of this filing, a dispersive Raman spectrometer utilizing a stable laser excitation source at wavelengths longer than 900 nm has not been developed.

For visible Raman spectroscopy utilizing CCD detectors, diode lasers are theoretically the most desirable of solid-state lasers for a number of reasons. First, they have the best power efficiency. Second, they are extremely compact, generally being integrated into standard transistor type cans. These packages can be easily mounted and integrated into compact and ruggedized systems perfect for field process control applications. Third, per milliwatt, they are the lowest cost lasers available. Finally, since the entire cavity is integrated into one small silicon package, assembly costs are minimal.

Unfortunately, the practicality of diode lasers is challenged by their spectral stability. Diode lasers come in four basic types, Fabry-Perot, distributed feedback (DFB), distributed Bragg reflector (DBR), and external cavity. All are inherently wavelength unstable, some more than others. The inherent instability stems from a gain curve that is large allowing several longitudinal modes to fit within the gain curve. The Fabry-Perot design does not allow for any discrimination between the modes, and consequently, many different lasing modes will be present at a given time. This alone makes Raman spectroscopy difficult; in addition, the modes are constantly changing wavelength and intensity. This is due to the phenomenon of hole-burning. Hole-burning entails the depopulation of a discrete energy level due to intense irradiation at that wavelength. In diode lasers this can occur due to optical feedback of the laser light. In other words, the feedback can cause a diode laser to stop lasing at a given wavelength and start at another. This effect is generally called mode-hopping. The other three models, DFB, DBR, and the external cavity, incorporate wavelength discrimination to better lock onto a single longitudinal mode. However, even these lasers can shift wavelength due to thermal changes in the cavity and optical feedback from external sources to the cavity. Feedback is a persistent problem with diode lasers as their optical characteristics and small size tend to produce a divergent cone of light rather than a well collimated beam. The optics needed to produce collimation will inherently cause reflections and feedback.

The DFB, DBR, and external cavity lasers tend to have an output that at low resolution appears to be a single longitudinal mode. However, close examination over long time periods show that even these lasers when operating under working conditions have several discrete longitudinal modes that they prefer to operate in. Applications where precise wavelength calibration and/or precise intensities are not needed are possible with these lasers. However, in analytical chemistry applications where precision of less than 5 to 10% is needed, these lasers will not perform to specifications.

The intensity of Raman scattering observed from a sample constituent is directly proportional to the concentration of the constituent. This has been used to quantitate samples with Raman spectroscopy. The intensity of Raman scattering can be measured as a peak height, or, more commonly, a peak area is determined by integrating between the two points on either side of the peak. If the system being quantitated is consistent in properties between samples, it is possible to get very precise quantitation. When samples vary in properties (for example, fluorescence background), it becomes necessary to include some sort of internal standard to the sample or sampling system that corrects for sample to sample variation. Such an internal standard can also correct for laser intensity changes. However, it cannot correct for more than one variation as this would exceed the fundamental problem of having more unknowns than equations.

A serious problem with this method is that Raman spectra often have a background offset and all Raman spectra have a background noise level. If the laser intensity changes by a certain amount, then correction of the spectrum by multiplication will effect the noise level and change the background offset. This in turn can affect the integration or peak height measurement and consequently lead to less precise quantitation values. Furthermore, if the internal standard has a different peak shape or width than the analyte, changes due to mode-hopping may effect one more than another.

Modern analytical chemistry has become more sophisticated in its data analysis procedures. Currently, a popular method for quantitation is called Partial Least Squares (PLS). PLS is a complex mathematical algorithm that can find correlations between intensities in a Raman spectrum with changes in concentration. Once the correlating portions of the spectrum are located, PLS creates factors which mimic the spectrum with a unit intensity. An unknown sample can be quantified by determining a multiplier for the factors that reproduces the unknown spectrum. While this may appear complicated compared to using peak intensities, it is simple to automate and removes subjectivity from quantitation measurements.

PLS is an excellent way to quantify complex mixtures of materials if the laser source is stable. It is capable of finding correlations in a spectrum with large numbers of constituents and provides simple methods for outlier detection. PLS does have problems when the source is not stable. In particular, when the source moves in wavelength, PLS has difficulty matching its unit spectra with the unknown spectrum to minimize the residual as the subtraction of predicted spectrum vs actual spectrum produces a large residual due to the wavelength shift. This sensitivity of PLS to laser stability in combination with the inherent instability of diode lasers creates a debilitating problem with applications of Raman spectroscopy using diode laser sources.

Consequently, eliminating fluorescence and source spectral stability are the single most important components in ensuring accurate quantitative measurements. Thus, by going to longer wavelengths and using a laser that is inherently stable, more accurate results in process are ensured.

SUMMARY OF THE INVENTION

I. General Statement of the Invention

According to the invention, a diode-pumped solid state (DPSS) laser emitting monochromatic light at 1064 nm is used as an excitation source to irradiate a sample and subsequently generate Raman scattering from the sample being analyzed.

The generated Raman scattered light is collected by optics. The collected Raman scatter is filtered to remove at least some of the Rayleigh scatter which has a wavelength that is the same as that of the excitation source. The Stokes Raman scattered light is directed to a spectrograph wherein the light is dispersed by a grating onto an InGaAs diode array detector which is sensitive to near-infrared radiation in the range 900–1700 nm. Each element of the detector yields an electrical response that is proportional to the Stokes Raman scattering at a particular wavelength. The analog electrical response for each diode array element is converted into a digital response using an analog-to-digital converter. The total of all of the digital responses for each element of the diode array detector constitutes a Stokes Raman spectrum of the sample being irradiated.

II. Utility of the Invention

The invention allows the collection of fluorescent-free and reproducible Raman spectra of samples which exhibit significant fluorescence when using existing commercial dispersive Raman instruments. The invention is extremely stable and rugged when compared to interferometric based instrumentation which use diode-pumped solid state laser excitation at 1064 nm. The invention is inexpensive when compared to interferometric based instrumentation. The invention is compact when compared to interferometric based instrumentation. The invention yields comparable signal to noise when compared to interferometric based instrumentation. The invention eliminates the occurrence of mode "hopping" which is encountered with dispersive Raman instruments utilizing diode semiconductor lasers. In general, the invention has significant advantages over commercial dispersive Raman instruments as well as commercial FT-Raman instruments.

REFERENCE NUMERALS IN DRAWINGS

10—GaAs diode laser with 808 nm output
11—collimating optic
12—anamorphic prism pair
13—focusing optic
14—mirror, 99.8% reflective at 1064 nm and anti-reflective at 808 nm
15—Nd:VO$_4$ a-cut crystal
16—mirror, 90% reflective at 1064 nm
17—collimating optic
30—diode pumped solid state (DPSS) laser with 1064 nm output
31—focusing optic
32—fiber optic
33—collimating optic
34—dielectric shortpass filter
35—beamsplitter, passes 1064 nm light, reflects wavelengths greater than 1064 nm
36—focusing optic
37—sample
38—dielectric longpass filter
39—focusing optic
40—remote fiber-optic Raman probe
41—fiber optic
42—optic
43—entrance slit to spectrograph
44—collimating optic
45—volume holographic transmissions grating 46—focusing optic
47—InGaAs diode array detector
48—spectrograph
49—computer
50—diode pumped solid state (DPSS) laser with 1064 nm output
51—focusing optic
52—fiber optic
53—collimating optic
54—dielectric shortpass filter
55—beamsplitter, passes 1064 nm light, reflects wavelengths greater than 1064 nm
56—focusing optic
57—sample
58—dielectric longpass filter
59—focusing optic
60—remote fiber-optic Raman probe
61—fiber optic
62—fiber mated to entrance of spectrograph
63—collimating optic
64—volume holographic transmission grating
65—focusing optic
66—InGaAs diode array detector
67—spectrograph
68—computer
70—diode pumped solid state (DPSS) laser with 1064 nm output
71—dielectric shortpass filter
72—beamsplitter, passes 1064 nm light, reflects wavelengths greater than 1064 nm
73—focusing optic
74—sample
75—dielectric longpass filter
76—spectrometer excitation and collection optics
77—focusing optic
78—entrance slit to spectrograph
79—collimating optic
80—volume holographic transmission grating
81—focusing optic
82—InGaAs diode array detector
83—spectrograph
84—computer

DESCRIPTION OF THE PREFERRED EMBODIMENTS

EXAMPLE 1

Figure 1:
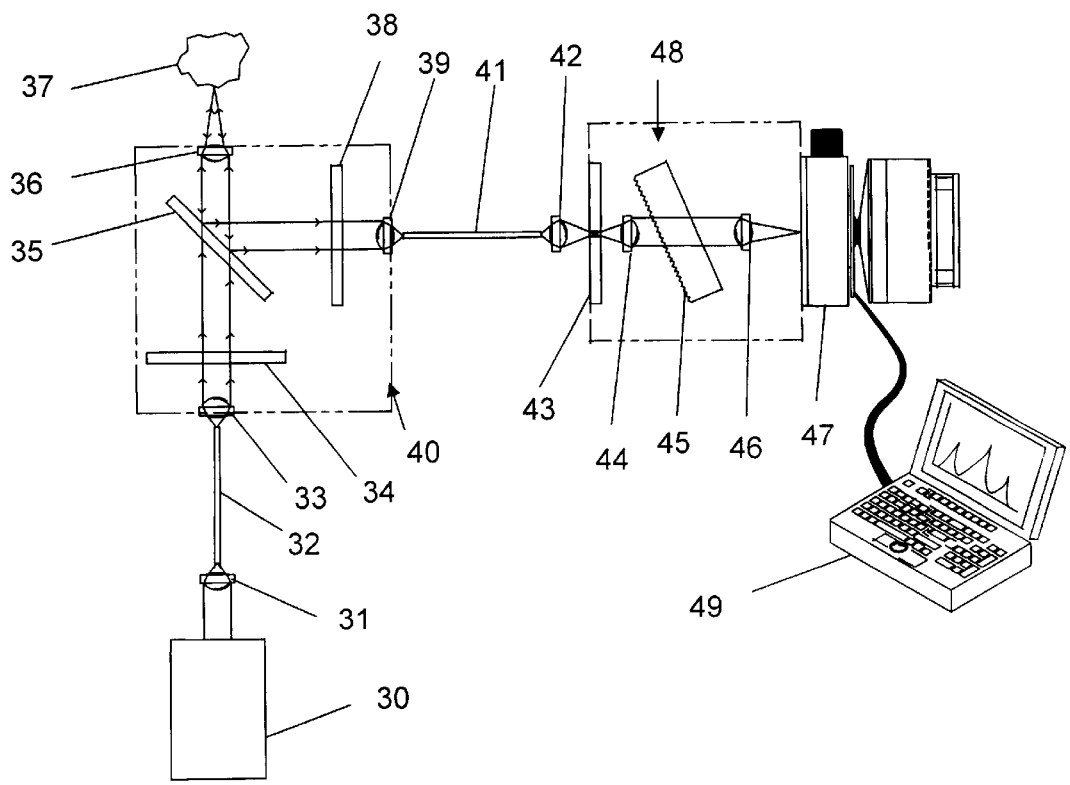
FIG. 1 is a diagram of an embodiment of the invention comprising a remote fiber optic probe.

Referring to FIG. 1, in this preferred embodiment of the invention, there are five main components: a diode pumped solid state (DPSS) Nd:VO$_4$ laser 30, a remote probe 40, a spectrograph 48, an InGaAs diode array detector 47, and a computer 49. The DPSS laser is connected to the remote probe. The remote probe is connected to the spectrograph. The InGaAs diode array is mounted directly on the spectrograph. The InGaAs diode array is interfaced to the computer.

Figure 2:
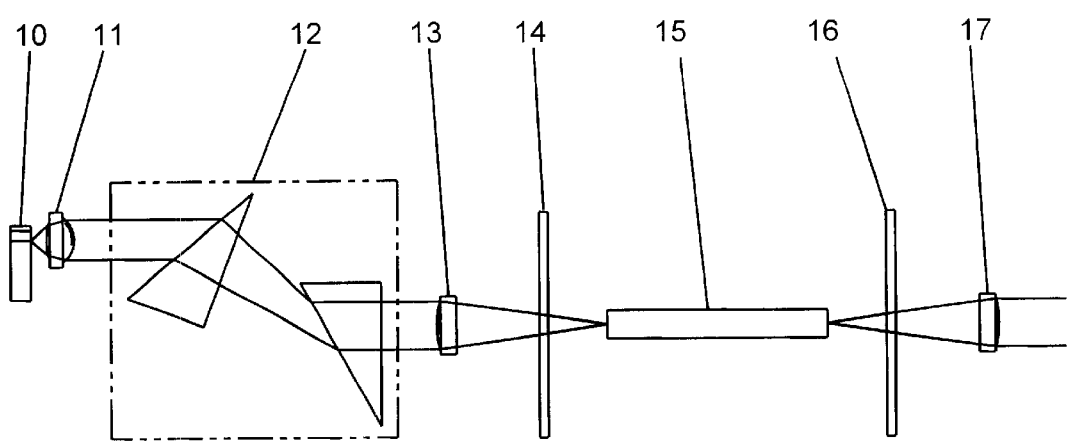
FIG. 2 is a diagram of a diode pumped solid state (DPSS) laser operating at 1064 nm.

Referring to FIG. 2, the DPSS laser consists of a GaAs diode semiconductor laser 10 emitting near 808 nm, a collimating optic 11 for collimating the laser light emitted by the diode laser, an optical beam shaping means 12 for elongating the narrow dimension of the collimated laser beam (typically, an anamorphic prism pair), a focusing optic 13 for focusing the collimated laser beam, a mirror 14 which reflects 99.8% of light at 1064 nm and is antiflective with respect to the 808 nm light, an a-cut Nd:VO$_4$ crystal into which the diode laser light at 808 nm is focused and which emits light at 1064 nm, a second reflective optic 16 which reflects a percentage (typically 85–95%) of the 1064 nm light emitted by crystal 15, and an output coupler 17 which defines the diameter and collimation length of the resulting output laser light. The ouput laser light from the DPSS laser is locked at 1064 nm via the characteristics of the lasing medium 15 and due to the laser cavity which is defined by the two reflective optical elements, 14 and 16. Even if the semiconductor diode laser 10 mode "hops", the output of the DPSS laser will remain fixed at the design wavelength.

Figure 3:
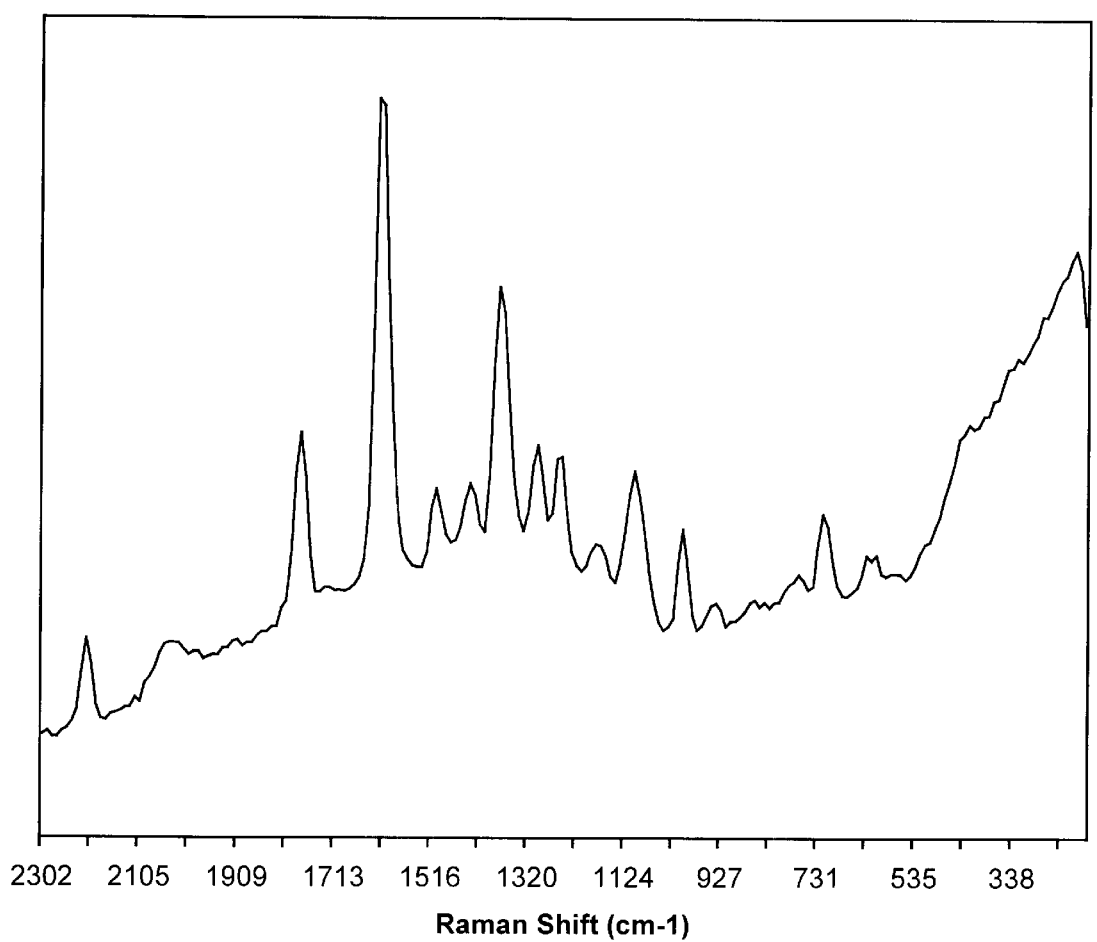
FIG. 3 is a Stokes Raman spectrum of a highly fluorescent polymer taken using the apparatus that is diagrammed in FIG. 2 using a one second integration time.
Figure 4:
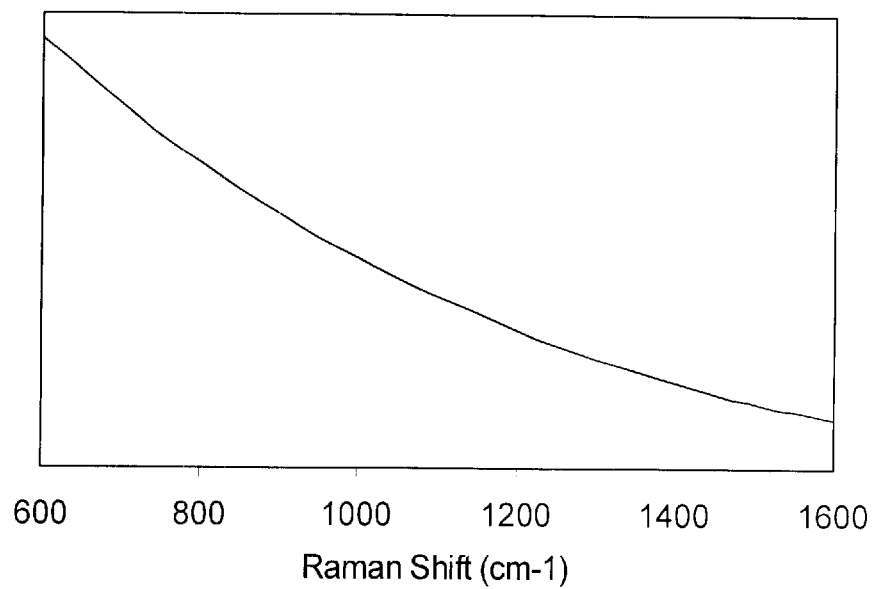
FIG. 4 is a Stokes Raman spectrum acquired using a conventional dispersive Raman spectrometer with diode laser excitation at 852 nm. The Raman spectrum is of the same highly fluorescent polymer described in FIG. 3. As can be seen, the resulting fluorescence obscures the Raman spectral intensities.

Referring to FIG. 1, excitation light from a diode-pumped solid state laser 30 emitting at 1064 nm is focused by a focusing optic 31 into a first fiber optic 32. The fiber transmits the excitation light to a remote probe 40 which is attached to the first fiber optic 32. At the probe, the 1064 nm excitation light leaves the fiber and is collimated by a second optic 33. The collimated 1064 nm excitation light is subsequently filtered with a shortpass filter 34 to remove unwanted Raman scattering induced by transmission through the fiber. The filtered excitation light is passed through a beamsplitter 35 which has an angle of ~45 degrees with respect to the incident collimated 1064 nm excitation light. The beamsplitter is such that it only passes light in a narrow bandpass centered at the excitation wavelength. A third optic 36 is used to focus the excitation light onto a sample 37 and generate Raman scatter. The Raman scatter is collected by the third optic 36 and collimated. The collimated Raman scatter is reflected off of the beamsplitter 35 at an angle which is 90 degrees to the angle of incidence. The reflected and collimated Raman scatter is passed through a longpass filter 38 to remove or significantly reduce the intensity of the 1064 nm excitation light (collected as Rayleigh scattered light at the sample). The Raman scatter is focused using a fourth optic 39 into a second fiber optic 41 connected to the remote probe 40 and transmitted to a spectrograph 48. Upon exiting the second fiber 41, the Raman scatter is focused using a fifth optic 42 onto an entrance slit 43. A sixth optic 44 is used to collimate the Raman scatter after it has passed through the entrance slit 43. The collimated Raman scatter is subsequently dispersed using a volume holographic transmission grating 45. The dispersed Raman scatter is focused using a seventh optic 46 onto an indium gallium arsenide (InGaAs) diode array detector 47 (InGaAs array) comprised of 256 or more discrete diode elements (not shown) each of which is connected to an integrating capacitor (not shown) and standard multiplexer readout circuitry (not shown). The signal is produced by the detector using double correlated sampling. This is performed by 1) resetting the capacitor, 2) reading out the capacitor after the diode has been exposed for a very short time interval (typically, <1 millisecond), 3) resetting the capacitor, 4) reading out the capacitor after the diode has been exposed for a much longer time interval (typically, >500 milliseconds), and 5) taking the difference of the two readouts. The use of double correlated sampling helps eliminate thermal background and diode voltage offsets. An example of an InGaAs diode array detector capable of the double correlated sampling is the EG&G J18 InGaAs diode array (Perkin Elmer Optoelectronics Division, Pennsylvania). The resulting analog signal from the detector is converted to a digital signal using an A/D converter (not shown) and displayed on a computer 49 as a Raman spectrum of the sample. In the Raman spectrum, the y-axis corresponds to the intensity of Raman scatter at a particular wavelength, while the x-axis corresponds to wavelength. More typically, the x-axis is converted from wavelength units into Raman shift units. This conversion involves converting each x-axis wavelength into a frequency proportional unit such as cm$^{-1}$, and then subtracting this unit from the corresponding frequency proportional unit for the excitation source. An example of the resulting Raman spectrum acquired in one second using this embodiment of the invention is shown in FIG. 3. The Raman spectrum exhibits no fluorescence background, and the signal/noise ratio is sufficient for both qualitative and quantitative analysis. For comparison, a spectrum of the same sample acquired with a conventional dispersive Raman instrument using 852 nm diode laser excitation is shown in FIG. 4. As can be seen, the fluorescence background overwhelms the Raman signal making both qualitative and quantitative analysis impossible.

EXAMPLE 2

Figure 5:
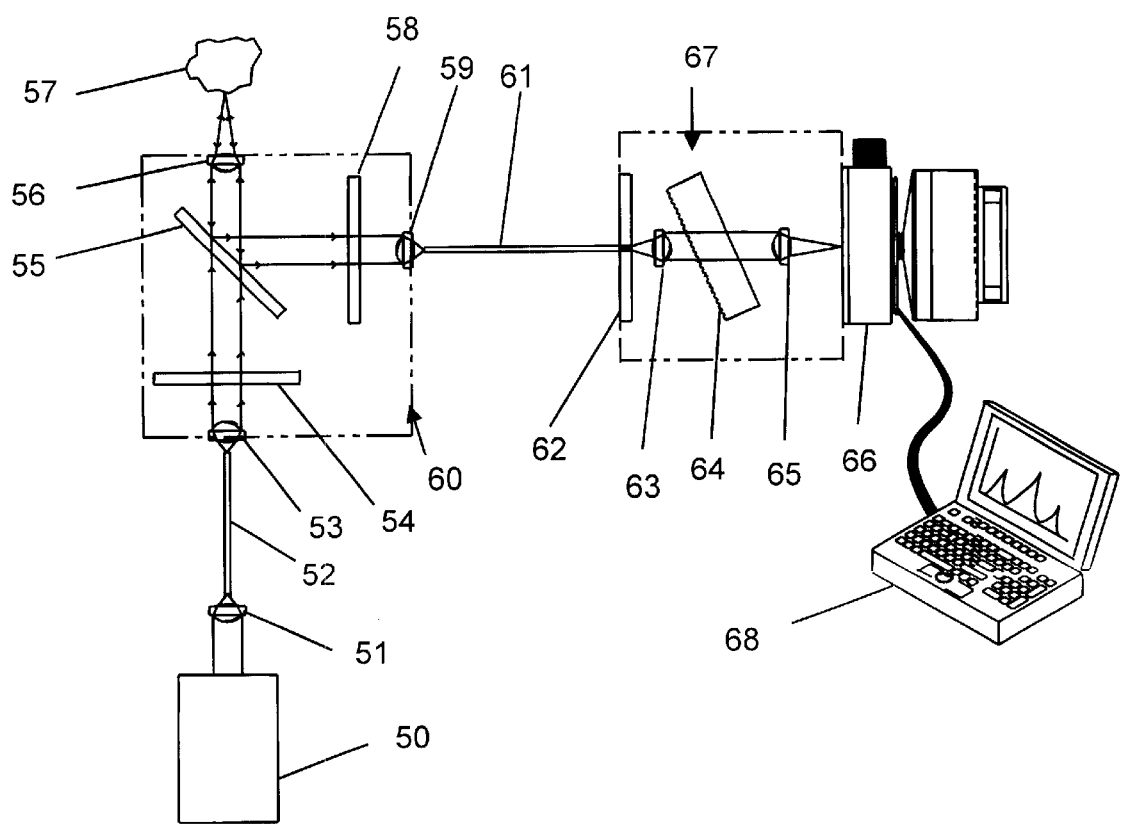
FIG. 5 is a diagram of an embodiment of the invention which is similar to that shown in FIG. 2, but utilizes a fiber optic mated directly to a slit as the entrance to the spectrograph.

Referring to FIG. 5, this embodiment of the invention differs from Example 1 in that a fiber optic 61 which interfaces the remote probe to a spectrograph 67 is directly mated to an entrance slit 62 of the spectrograph without using an optic.

Referring to FIG. 5, excitation light from a diode-pumped solid state laser 50 emitting at 1064 nm is focused by a focusing optic 51 into a first fiber optic 52. The fiber transmits the excitation light to a remote probe 60 which is attached to the first fiber optic 52. At the probe, the 1064 nm excitation light leaves the fiber and is collimated by a second optic 53. The collimated 1064 nm excitation light is subsequently filtered with a shortpass filter 54 to remove unwanted Raman scattering induced by transmission through the fiber. The filtered excitation light is passed through a beamsplitter 55 which has an angle of ~45 degrees with respect to the incident collimated 1064 nm excitation light. The beamsplitter is such that it only passes light in a narrow bandpass centered at the excitation wavelength. A third optic 56 is used to focus the excitation light onto a sample 57 and generate Raman scatter. The Raman scatter is collected by the third optic 56 and collimated. The collimated Raman scatter is reflected off of the beamsplitter 55 at an angle which is 90 degrees to the angle of incidence. The reflected and collimated Raman scatter is passed through a longpass filter 58 to remove or significantly reduce the intensity of the 1064 nm excitation light (collected as Rayleigh scattered light at the sample). The Raman scatter is focused using a fourth optic 59 into a second fiber optic 61 connected to the remote probe 60 and transmitted to a spectrograph 67. The opposing end of the second fiber 61 is mated directly to the entrance slit 62 of the spectrograph 67. The Raman scatter exiting the fiber optic 61 is collimated using a fifth optic 63. The collimated Raman scatter is subsequently dispersed using a volume holographic transmission grating 64. The dispersed Raman scatter is focused using a sixth optic 65 onto an indium gallium arsenide (InGaAs) diode array detector 66 (InGaAs array) comprised of 256 or more discrete diode elements. The resulting analog signal from the detector is converted to a digital signal and displayed on a computer 68 as a Raman spectrum of the sample.

EXAMPLE 3

Figure 6:
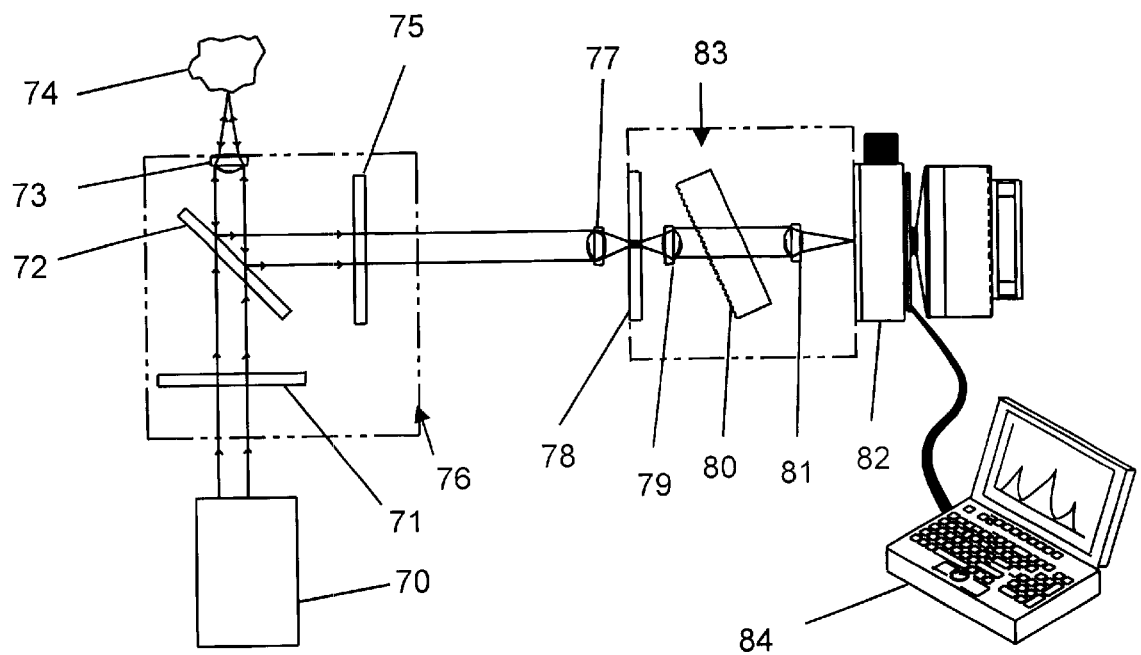
FIG. 6 is a diagram of an embodiment of the invention comprising a sampling arrangement which does not involve the use of fiber optics or a remote probe.

Referring to FIG. 6, this embodiment of the invention differs from that of EXAMPLE 1 and EXAMPLE 2 in that in lieu of a remote probe and fiber optics, a set of excitation/collection optics 76 is used.

Referring to FIG. 6, collimated excitation light from a diode-pumped solid state laser 70 emitting at 1064 nm is first filtered by dielectric bandpass filter 71 which only allows 1064 nm light to pass. The filtered excitation light is passed through a beamsplitter 72 which has an angle of ~45 degrees with respect to the incident collimated 1064 nm excitation light. The beamsplitter 72 is such that it only passes light in a narrow bandpass centered at the excitation wavelength. A focusing optic 73 is used to focus the excitation light onto a sample 74 and generate Raman scatter. The Raman scatter is collected by the focusing optic 73 and collimated. The collimated Raman scatter is reflected off of the beamsplitter 72 at an angle which is 90 degrees to the angle of incidence. The reflected and collimated Raman scatter is passed through a longpass filter 75 to remove or significantly reduce the intensity of the 1064 nm excitation light (collected as Rayleigh scattered light at the sample). The Raman scatter is focused using a second focusing optic 77 onto an entrance slit 78 of a spectrograph 83. A third optic 79 is used to collimate the Raman scatter after it has passed through the entrance slit 79. The collimated Raman scatter is subsequently dispersed using a volume holographic transmission grating 80. The dispersed Raman scatter is focused using a fourth optic 81 onto an indium gallium arsenide diode array detector 82 (InGaAs array) comprised of 256 or more discrete diode elements. The resulting analog signal from the detector is converted to a digital signal and displayed on a computer 83 as a Raman spectrum of the sample.

Modifications

Specific methods or embodiments discussed are intended to be only illustrative of the invention disclosed by this specification. Variation on the methods or embodiments are readily apparent to a person of skill in the art based upon the teachings of this specification and are therefore intended to be included as part of the inventions disclosed herein.

Examples include an apparatus comprising in combination: a) a DPSS laser excitation means; b) a sample irradiation means; c) a Raman collection means; d) a spectrograph; and e) an InGaAs diode array detector comprising 256 or more elements. Also in the examples is an apparatus in which the excitation source means is a diode pumped solid state laser emitting at wavelengths at least greater than 900 nm but not at 1064 nm. An additional example is an apparatus similar to that described in EXAMPLE 1 comprising a spectrograph whose entrance comprises a single fiber optic; a linear array of fiber optics; a single fiber optic mated directly to a slit; or a linear array of fiber optics mated directly to a slit. Another example is an apparatus similar to that described in EXAMPLE 1 comprising a remote probe whose design and configuration is described in documents referenced in this specification. Another example is an apparatus similar to that described in EXAMPLE 1, EXAMPLE 2, or in EXAMPLE 3 where a holographic notch filter is used in place of longpass filters 38, 58, or 75, respectively. Another example is an apparatus similar to that described in EXAMPLE 1, EXAMPLE 2, or in EXAMPLE 3 where a bandpass filter is used in place of shortpass filters 34, 54, or 71, respectively. Another example is an apparatus similar to that described in EXAMPLE 1, EXAMPLE 2, or EXAMPLE 3 where a reflective grating is used in place of volume holographic transmission gratings 45, 64, or 80, respectively. Another example is an apparatus similar to that described in EXAMPLE 1, EXAMPLE 2, or EXAMPLE 3 where a concave reflective grating is used in place of one or more powered optics and in place of volume holographic transmission gratings 45, 64, or 80, respectively. Another example is an apparatus similar to that described in EXAMPLE 1, EXAMPLE 2, or EXAMPLE 3 where the spectrograph consists of a different geometry than that described. For instance, one skilled in the art will realize that a variety of spectrograph designs may be substituted for the designs described in EXAMPLE 1, EXAMPLE 2, and EXAMPLE 3. For illustrative purposes, suitable spectrograph geometries include, but are not limited to, a Czerny-Turner spectrograph, a Ebert-Fastie spectrograph, an off-axis Ebert-Fastie spectrograph, a Monk-Gillieson spectrograph, a Rowland Circle spectrograph, a Wadsworth spectrograph, a Seya-Namioka spectrograph, and a corrected concave-grating flat-field spectrograph.

Another example is an apparatus similar to that in EXAMPLE 1, EXAMPLE 2, or EXAMPLE 3 where the diode pumped solid state laser does not involve the use of a beam shaping means 12. Another example is an apparatus similar to that in EXAMPLE 1, EXAMPLE 2, or EXAMPLE 3 where the diode pumped solid state laser uses a lasing medium other than $Nd:VO_4$. One skilled in the art will know that there are several diode pumped solid state laser designs which vary to some extent from the one shown in FIG. 2 and described in EXAMPLE 1. Therefore, another example is an apparatus similar to that in EXAMPLE 1, EXAMPLE 2, or EXAMPLE 3 wherein the diode pumped solid state laser differs from the excitation means described in EXAMPLE 1, but is comprised of at least a diode laser and a laser cavity comprising at least a solid crystal lasing medium and two optical surfaces which are reflective with respect to the DPSS laser output wavelength.

Another example is an apparatus similar to that in EXAMPLE 1, EXAMPLE 2, or EXAMPLE 3 where the analog signal from the detector is converted into a digital signal using the analog-to-digital converter of a standard 16 bit data acquisition card which is plugged into a computer.

Another example is an apparatus similar to that in EXAMPLE 1, EXAMPLE 2, or EXAMPLE 3 where the analog signal from the detector is converted into a digital signal using an analog-to-digital converter which is an integral part of the detector and the resulting digital signal is transmitted to a computer using a standard communications protocol.

Another example is an apparatus similar to that in EXAMPLE 1, EXAMPLE 2, or EXAMPLE 3 where the spectrograph and detector are mounted directly on a card which can be plugged directly into a computer bus slot.

Reference to documents made in the specification is intended to result in such patents or literature being expressly incorporated herein by reference.

Advantages

From the description above, a number of advantages of the invention become evident:

(a) The invention ensures wavelength stability of the Raman spectrum. This allows the invention to be used for demanding process control, quality control, and research applications where the use of conventional diode laser based Raman spectrometers is not feasible due to wavelength instabilities.

(b) The invention eliminates fluorescent background signals that interfere with the Raman spectrum. This allows the invention to be used for the analysis of samples such as diesel fuels or high performance thermosets (e.g. polyimides) where the use of conventional dispersive Raman spectrometers is impossible.

(c) The invention is lightweight and rugged with no moving parts allowing for industrial and field use where the use of interferometric based spectrometers is not feasible.

(d) The invention is inexpensive to manufacture when compared to conventional interferometric Raman spectrometers allowing it to be used for applications for which Raman spectroscopy was previously considered cost prohibitive.

What is claimed is:

1. An apparatus for generating Raman scatter of a sample and measuring said Raman scatter of sample, said apparatus comprising:

an excitation means for irradiating said sample and generating Raman scatter; said excitation means comprising a diode pumped solid state (DPSS) laser which emits light at wavelengths at least greater than 900 nm;

a collection means for collecting said Raman scatter;

a detection means comprising a dispersive means for separating said Raman scatter by respective wavelength into a dispersed signal;

said detection means comprising a diode array detector for detecting said dispersed signal;

said detection means comprising an entrance for transmission of said Raman scatter into said detection means;

said diode array detector comprising an array of photo sensitive elements sensitive to at least light at wavelengths greater than 1200 nm.

2. The apparatus of claim 1 wherein said diode array detector comprises indium gallium arsenide (InGaAs).

3. The apparatus of claim 1 wherein said detection means comprises a spectrograph.

4. The apparatus of claim 1 wherein said entrance of said detection means comprises a slit.

5. The apparatus of claim 1 wherein said entrance of said detection means comprises a fiber optic.

6. The apparatus of claim 1 wherein said entrance of said detection means comprises a linear array of fiber optics.

7. The apparatus of claim 1 wherein said excitation means is delivered to said sample using fiber optic means.

8. The apparatus of claim 1 wherein a collection means is used to transmit said Raman scatter to said detection means.

9. The apparatus of claim 1 wherein said Raman scatter is delivered to said detection means using fiber optic means.

10. The apparatus of claim 1 wherein a filtering means is used to at least reduce the intensity of Rayleigh scattered light after it is generated by said sample being said irradiated.

11. The apparatus of claim 1 wherein a filtering means is used to at least reduce the intensity of Rayleigh scattered light after it is generated by said sample being said irradiated; said detection means comprises said filtering means.

12. The apparatus of claim 8 wherein a filtering means is used to at least reduce the intensity of Rayleigh scattered light after it is generated by said sample being said irradiated; said collection means comprises said filtering means.

13. The apparatus of claim 1 wherein said dispersive means comprises a reflection grating.

14. The apparatus of claim 1 wherein said dispersive means comprises a transmission grating.

15. The apparatus of claim 1 wherein said dispersive means comprises a volume holographic transmission grating.

16. The apparatus of claim 1 wherein said detection means is comprised of integrated electronics means for converting said detected signal from an analog format signal into a digital format signal.

17. The apparatus of claim 16 wherein said detection means and said integrated electronics means comprises a board mounted directly into a computer bus slot.

18. The apparatus of claim 16 wherein said digital format signal is transferred to a computer means.

19. The apparatus of claim 1 wherein said detection means is comprised of integrated electronics means for reading out said detected signal in an analog format; said analog format of detected signal is transferred to a computer means containing an analog-to-digital converter which subsequently converts the signal from an analog format into a digital format.

20. An apparatus for generating Raman scatter of a sample and measuring said Raman scatter of sample, said apparatus comprising:

an excitation means for irradiating said sample and generating Raman scatter; said excitation means comprising a DPSS laser which emits light at 1064 nm;

a collection means for collecting said Raman scatter;

a detection means comprising a dispersive means for separating said Raman scatter by respective wavelength into a dispersed signal;

said detection means comprising a diode array detector for detecting said dispersed signal;

said detection means comprising an entrance for transmission of said Raman scatter into said detection means;

said diode array detector comprising an array of photo sensitive elements sensitive to at least light at wavelengths greater than 1200 nm.

* * * * *